United States Patent [19]

Stokes

[11] Patent Number: 5,611,030

[45] Date of Patent: Mar. 11, 1997

[54] SUBJECTIVELY PLEASING COLOR GAMUT MAPPING IN A COLOR COMPUTER GRAPHICS SYSTEM

[75] Inventor: Michael Stokes, Cupertino, Calif.

[73] Assignee: Apple Computer, Inc., Cupertino, Calif.

[21] Appl. No.: 623,594

[22] Filed: Mar. 28, 1996

Related U.S. Application Data

[63] Continuation of Ser. No. 305,960, Sep. 16, 1994, abandoned.

[51] Int. Cl.$^6$ ........................................................ G06T 5/00
[52] U.S. Cl. .......................................... 395/131; 395/326
[58] Field of Search .................................... 395/131, 132, 395/155, 161, 157, 162–166; 382/162, 167; 358/504, 507, 518, 521, 523; 434/98, 102

[56] References Cited

U.S. PATENT DOCUMENTS 5,018,085   5/1991   Smith, Jr. ............................. 395/131 X

OTHER PUBLICATIONS

Boynton, Robert M., *A System of Photometry and Colorimetry Based on Cone Excitations*, Color, 11, 4:244–252 (1986).
Boynton, Robert M., et al., *Categorical Color Rendering of Four Common Light Sources*, Color, 15, 4:222–230 (1990).
Boynton, Robert M., et al., *Category Effectes in Color Memory*, Color, 14, 5:229–234 (1989).
Boynton, Robert M., et al., *Centroids of Color Categories Compared by Two Methods*, Color, 14, 1:6–15 (1989).
MacLeod, Donald I. A., et al., *Remarks on the Constant Luminance Chromaticity Diagram*, Color, 14, 3:157–158 (1989).

Shinoda, Hiroyuki, et al., *Categorized Color Space on CRT in the Aperture and the Surface Color Mode*, Color, 18, 5:326–333 (1993).

*Primary Examiner*—Almis R. Jankus
*Attorney, Agent, or Firm*—Burns, Doane, Swecker & Mathis, L.L.P.

[57] ABSTRACT

A method is provided for use in a color computer graphics system whereby mapping constraints are relaxed and redefined so as to allow out-of-gamut colors to be mapped to in-gamut colors in a manner that is significantly more visually pleasing than in conventional methods. More particularly, the present invention provides a method of mapping source device colors to destination device colors in a computer graphics system having a color image source device and a color image destination device having non-coincident color gamuts such that a plurality of colors within a color gamut of the source device are out of gamut colors outside a color gamut of the destination device. A color name is associated with an out-of-gamut color, which is mapped to a first in-gamut color within the color gamut of the destination device. A color name is also assiciated with the first in-gamut color. If the color name associated with the out-of-gamut color and the color name associated with the first in-gamut color are different, the out-of-gamut color is remapped to a different in-gamut color within the color gamut of the destination device. The color name associated with the out-of-gamut color and the color name associated with the first in-gamut color are based on psychophysical experimentation, i.e., are indicative of what an average user is likely to call the color in question. The remapping may be single-step or iterative.

6 Claims, 4 Drawing Sheets

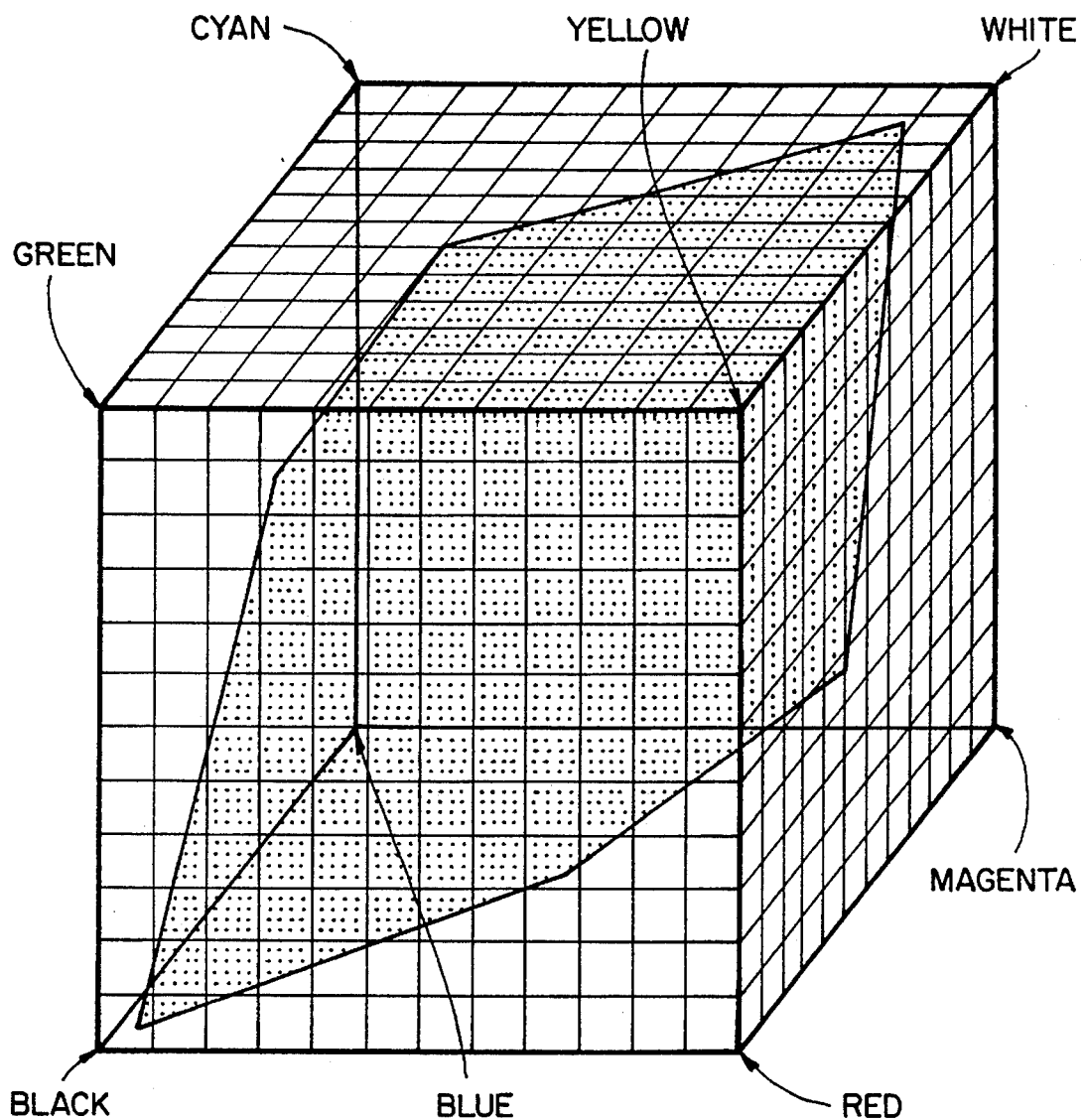
FIG_1

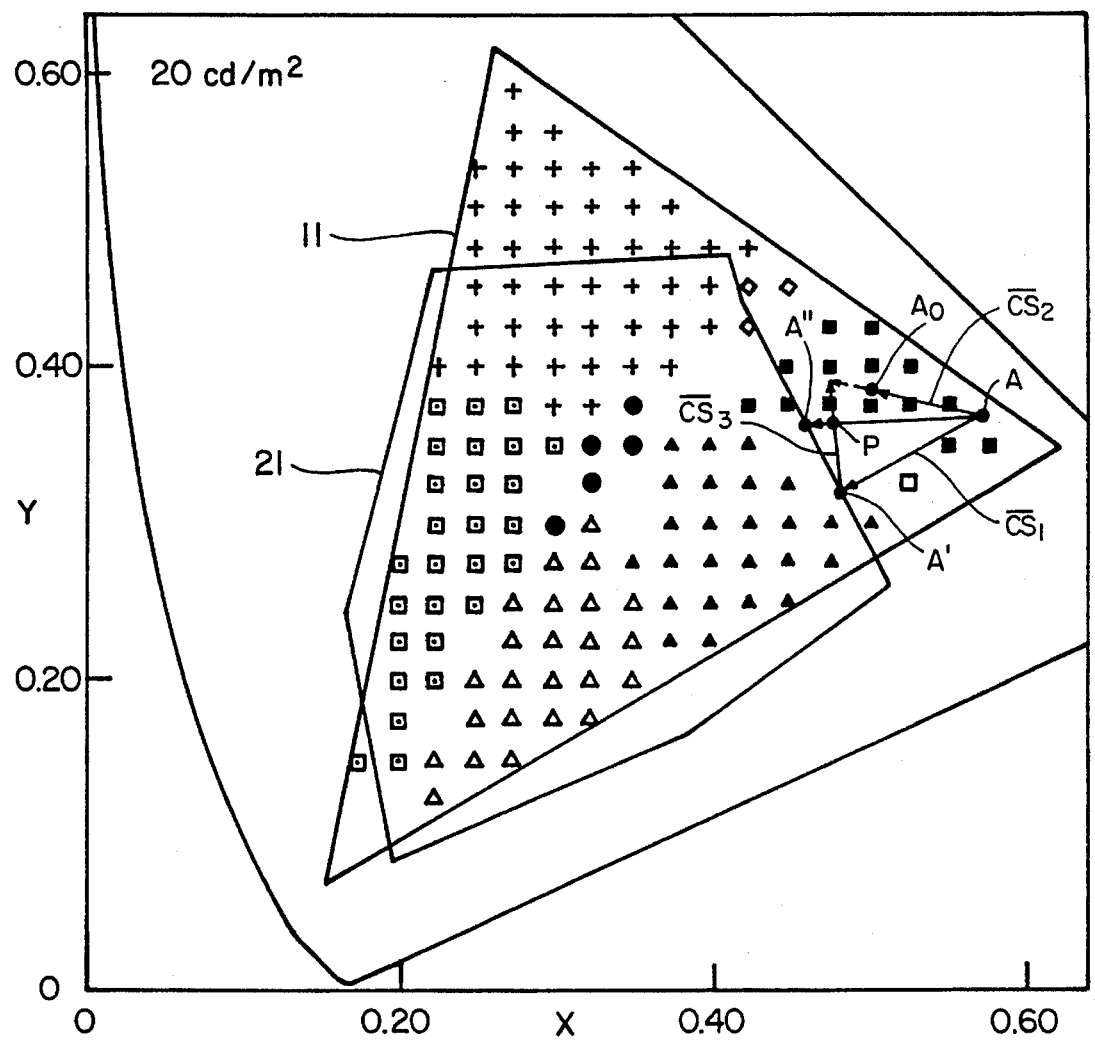
FIG_2

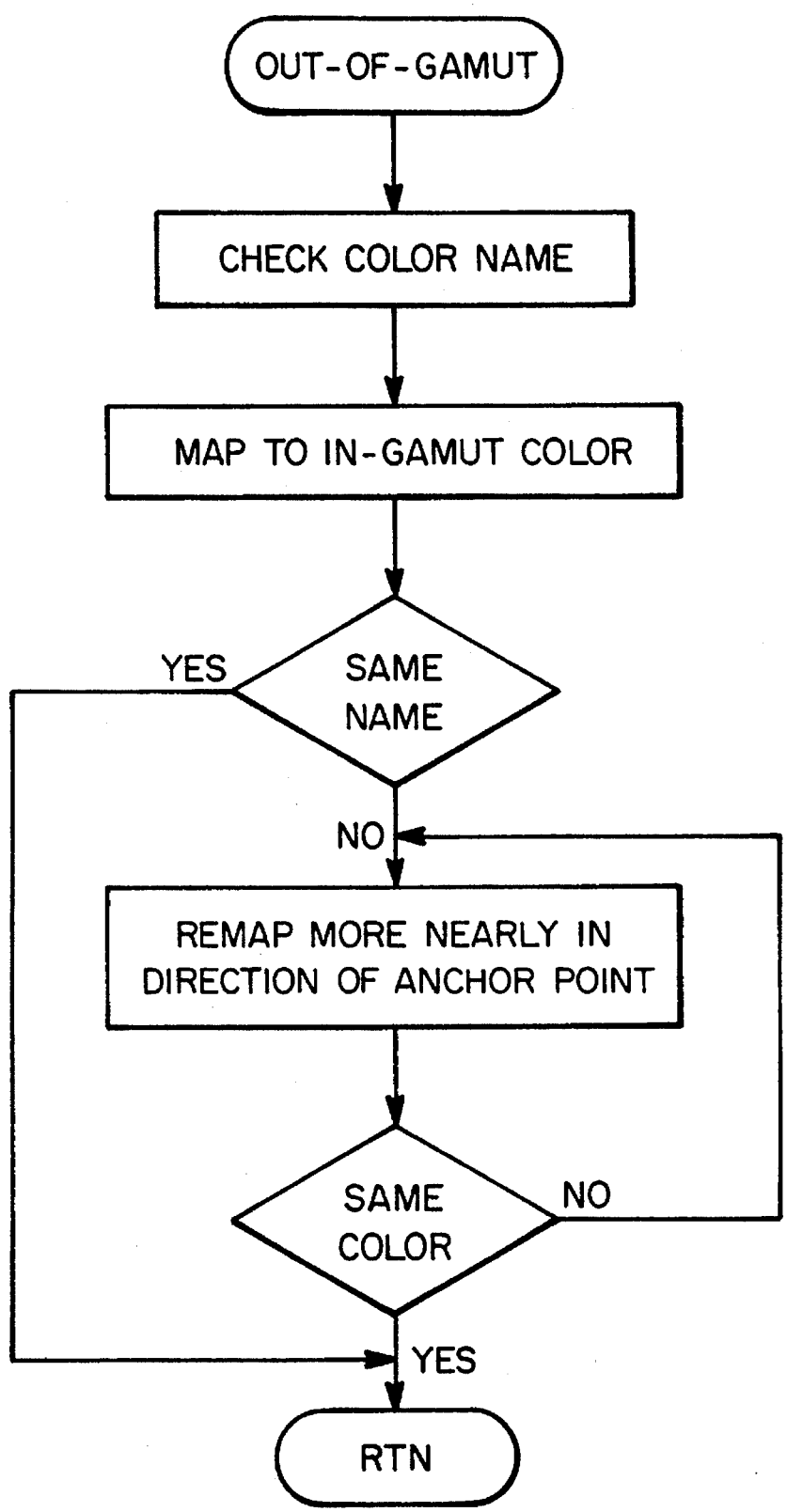
FIG_3

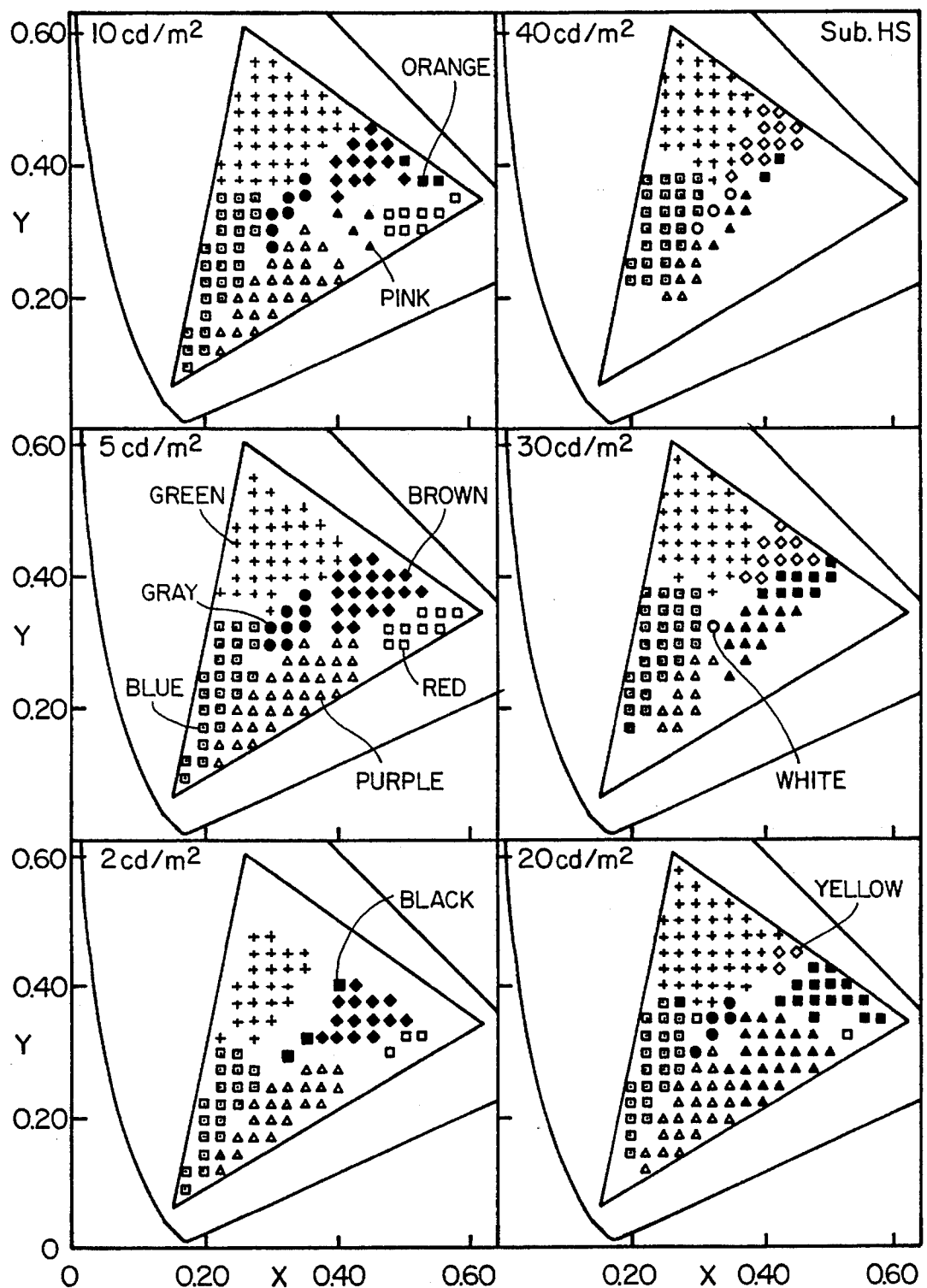
FIG_4
*(PRIOR ART)*

SUBJECTIVELY PLEASING COLOR GAMUT MAPPING IN A COLOR COMPUTER GRAPHICS SYSTEM

This application is a continuation of application Ser. No. 08/305,960, filed Sep. 16, 1994 now abandoned.

BACKGROUND OF THE INVENTION

1. Field of the Invention

The present invention relates to color computer graphics and more particularly to color gamut mapping in which source device colors not reachable by a destination device are mapped to other colors that are reachable by the destination device.

2. State of the Art

Color matching algorithms are intended to present information on one medium so that it appears the same as when presented on different media (for example, a computer display and a printed page) or on the same medium but rendered on different devices (for example, different printers). For Cathode Ray Tube (CRT) color displays, the CIE (Commission Internationale de l'Eclairage) has established color standards. Working from these standards, methods have been developed which allow all displays to present color in the same manner, even though different colors are used to generate the image. However, since printing is a subtractive process (CRTs using an additive process), it becomes difficult to tell a printer what amounts of its subtractive primaries to use to present the same color when told the additive primaries of the CRT.

Neugebauer, EFI, Kodak, and numerous others have attempted to convert from the color representation on a CRT to a color specification on a printer. The general consensus is that an interpolated table is an adequate method for converting from the CRT color space to the printer's color space. However, if one measures the colors available to a CRT and those available to a color printer, one finds that a small amount of colors which are printable cannot be displayed on the CRT, while many colors which may be displayed on the CRT cannot be printed, especially green, yellow, red, and magenta. The color range available to an imaging device is referred to as its color gamut, and this non-overlapping nature of the color gamuts between devices is known as gamut mismatch. The colors which a source device can image but the destination device cannot image are known as out-of-gamut colors. Since image areas containing out-of-gamut colors cannot simply be left blank when rendering an image, some decision must be made as to how such colors are to be represented. This process is know as gamut mapping.

Several gamut mapping techniques have been previously described, typically based on either device color spaces or perceptually uniform color spaces. (In perceptually uniform color spaces, color pairs separated by numerically equally color distances appear to a viewer as being in substantially the same color relationship to each other, a property which device color spaces typically do not have.)

Conventionally, two color gamut mapping methods have been used: clipping, in which out-of-gamut colors are mapped to an outer surface of the gamut, and compression, in which the source gamut is compressed so as to bring all of its colors within the destination gamut.

In clipping, the general rule for mapping from a source device (such as a CRT) to a destination device (such as a color printer) is that all colors which are available to the destination device should print the source device's color as closely as possible; when printing out of gamut colors, hue angle, lightness, and saturation of the source device should be preserved as closely as possible.

However, when this algorithm is implemented, users do not like the results, especially when attempting to present monitor saturated colors such as yellow, green, red, and magenta. Usually, the yellow is the most objectionable, because most CRT yellows are more green than the printer's yellow. The result is that when saturated CRT yellow is requested, the color matching algorithm maps this color to white or a washed-out green. This typically isn't what the user had in mind when requesting saturated yellow, although this is a correct color science representation of that color.

The disadvantage of clipping is that a range of out-of-gamut colors is mapped into a single color, losing important texture information. Clipping assumes that out-of-gamut colors will be few, such that the information loss produced by clipping is not conspicuous. Such is typically the case with computer-generated images. For photographic images, on the other hand, out-of-gamut colors may occur frequently in an image. In such an instance, clipping causes undesirable contouring and loss of texture information. In contouring, smooth, natural color transitions are broken up such that the resulting display contains abrupt, unnatural color transitions that are conspicuous and objectionable.

Compression assumes that out-of-gamut colors will occur frequently. In order to preserve texture information and avoid contouring, the colors of the source gamut are compressed so as to fit within the destination gamut. During compression, all of the colors within the source gamut are shifted. Compression may be linear, in which case all of the colors are shifted by proportionate amounts. The disadvantage of linear compression techniques is that none of the colors can match the original colors, and much of the colors contained in most images are compressed to a point which is visually objectionable. Furthermore, device-space-based compression techniques have the disadvantage of producing unpredictable hue, saturation and lightness shifts (although this problem can be reduced somewhat by translating to a "pseudo" hue, saturation and lightness color space).

Alternatively, compression may be non-linear, in which case an anchor point is chosen and colors farther away from the anchor point are shifted by proportionally greater amounts. The disadvantage of nonlinear compression based on perceptually uniform color spaces is that none of the colors can match the original colors. Therefore, although compression works well for photographic images, since every color is shifted from the source color to a different destination color, compression is unsuitable for computer-generated images. In computer-generated images, spot colors are specified for artwork and logos, for example. Color displayed on the computer screen during design must match those printed during production to assure satisfactory results. For this purpose, clipping is preferable, since in-gamut colors remain unchanged during gamut mapping.

With either technique, clipping or compression, two different mapping methods are prevalent. The first mapping method maintains one or two dimensions (usually hue and then lightness) in preference to the other dimension(s). For example, one might maintain hue and lightness and compress or clip chroma. The second mapping method minimizes the color distance, for example CIELAB $\Delta E$, or a similar perceptual loss function. Whereas typically a compression mapping is a linear mapping, a nonlinear mapping can be created based on the CIE $\Delta E^*$ recommendation or on psychophysical experimentation. Nonlinear compression allows for more optimal use of gamut space and avoids the very objectional results sometimes produced by linear compression.

Assuming that images to be printed will typically consist of a combination of natural images and computer generated images, ideally the natural images would be color gamut mapped so as to preserve texture information and avoid contouring, and the computer generated images would be color gamut mapped to maintain in-gamut colors. However, there is usually no way to tell the source of a color specification.

By using a weighted combination of both linear and nonlinear mapping methods, it is possible to tune the mapping algorithm to create the most acceptable compromise. The weighting algorithm should be derived through carefully monitored psychophysical experiments. One such mapping method is disclosed in copending U.S. patent application Ser. No. 08/305,959, filed Sep. 16, 1994 pending, which is incorporated herein by reference.

One of the most objectionable artifacts of the type of mappings described is that colors can cross name boundaries. For example, a reddish color might map into a yellowish or orangish color. A viewer's eye is especially senstive to such hue shifts. Because of the importance placed on avoiding hue shifts, previous gamut mapping methods have been rather inflexible. That is, hue shifts have been minimized because of no scientific basis on which to constrain them.

What is needed, then, is a method of color gamut mapping that allows for greater flexibility in gamut mapping without producing objectionable hue shifts or other artifacts.

SUMMARY OF THE INVENTION

The present invention, generally speaking, provides a method for use in a color computer graphics system whereby mapping constraints are relaxed and redefined so as to allow out-of-gamut colors to be mapped to in-gamut colors in a manner that is significantly more visually pleasing than in conventional methods. More particularly, the present invention provides a method of mapping source device colors to destination device colors in a computer graphics system having a color image source device and a color image destination device having non-coincident color gamuts such that a plurality of colors within a color gamut of the source device are out of gamut colors outside a color gamut of the destination device. A color name is associated with an out-of-gamut color, which is mapped to a first in-gamut color within the color gamut of the destination device. A color name is also associated with the first in-gamut color. If the color name associated with the out-of-gamut color and the color name associated with the first in-gamut color are different, the out-of-gamut color is remapped to a different in-gamut color within the color gamut of the destination device. The color name associated with the out-of-gamut color and the color name associated with the first in-gamut color are based on psychophysical experimentation, i.e., are indicative of what an average user is likely to call the color in question. The remapping may be single-step or iterative. In the case of an iterative remapping, if the color name associated with the out-of-gamut color and the color name associated with the different in-gamut color are different, the out-of-gamut color is remapped to a still different in-gamut color within the color gamut of the destination device. This step is repeated until the color name associated with the out-of-gamut color and the color name associated with the different in-gamut color are the same.

BRIEF DESCRIPTION OF THE DRAWING

The present invention may be further understood from the following description in conjunction with the appended drawing. In the drawing:

FIG. 1 is a perspective view of an RGB cube representing a color source device and a cloud of destination device measurements;

FIG. 2 is a diagram illustrating the manner in which colors are prevented from crossing color name boundaries during gamut mapping;

FIG. 3 is flowchart illustrating the manner in which colors are prevented from crossing color name boundaries during gamut mapping; and FIG. 4 is a diagram of categorized color in accordance with Shinoda et al.

DETAILED DESCRIPTION OF THE PREFERRED EMBODIMENTS

Preferred embodiments of the gamut mapping method of the present invention are described with reference to a system including an input device and/or interactive graphics software that permit specification by a user, directly or indirectly, of color text, images, or the like; a display device in communication with the input device for displaying the specified text/images in an RGB format; and a color printer output device in communications with the input and/or display device for printing in a CMYK format the text/images specified by the input device and displayed on the display device. The gamut mapping method is equally applicable to other types of color input or output devices such as printing presses, image scanning devices, film recorders, color liquid crystal displays, other types of color displays, and the like. In fact, the present invention is applicable to color mapping between any arbitrary pair of a source device and a destination device. For convenience of description, however, the invention will be described in the context of building an interpolated table for converting from a CRT color space to a printer's color space.

Briefly, this is accomplished by, first, measuring the printable colors in some perceptually-uniform, device-independent color space, such as L*a*b*. Next, a table is generated which sub-samples all colors available to the specified color space, converting the sub-sampled colors to the reference color space from the CRT color space. For example, in the case of a calibrated RGB color space in which each color component is specified by an eight-bit value from 0 to 255, the sub-sampling might sample only those colors whose components differ in the four most-significant bits. In the resulting table, entries within the color gamut of the target printer are each filled in with the closest printable color. Colors out of the printer's gamut are mapped by clipping or compression into the printer gamut. A requested color is converted to the reference color space (e.g., a calibrated RGB space), then looked up in the table, and the resulting color specification is sent to the printer.

The mapping described may be represented geometrically. Referring to FIG. 1, each grid intersection represents an entry in the 3-D lookup table. The cube represents all colors available to the source device. The dots represent the available colors of the destination device as determined by colorimetric measurements. Lookup table values assigned to grid intersections within the cloud of dots are interpolated from the measured data. Lookup table values assigned to grid intersections not within the cloud are assigned values based on nonlinear interpolation.

In general, mapping from the source color space to the destination's color space involves the steps of measuring colors available to the destination device, building a three-dimensional lookup table relating source device colors and destination device colors, and using the lookup table to converting a specified color from the source color space to the destination color space. Each of these steps are described in greater detail.

Measuring Colors Available to the Destination Device

Initially, the color gamut of the destination device is assumed to be unquantified. In order to accurately characterize the color gamut of the destination device, colors produced by the destination device are measured in a device-independent color space (such as L*a*b*). The colors measured should include a large number of primary colors, secondary colors, cross colors, and achromats (grays) so as to be representative of the entire color space of the destination device. In the case of a color ink-jet printer, for example, several hundred measurements might be generated in order to achieve accurate color matching.

A first lookup table is then built which characterizes the L*a*b* color according to the color specification sent to the destination device (for example, CMYK). The result is a large number of color specification pairs (L*a*b*, CMYK). The order of the pairs within the first table is not important.

Building the Lookup Table

After measuring the colors available to the destination device, lookup table entries are then generated based on the measured data. For each step, the device independent color specification (L*a*b*) for the source color is calculated using a set of well-known mathematical relations.

Whether or not the color is reproducible by the destination device is judged in accordance with distances in the device-independent color space between the source device color and the closest measured destination device colors. The euclidean distance (or color distance, $\Delta E^*$) between the source color and each measured device color is calculated in turn, and some number of the closest device colors are retained in order from closest to farthest in a scratchpad area of computer memory. In an exemplary embodiment, the 20 closest measured destination colors are stored.

If the distance from the source color to the closest destination color is less than or equal to some threshold value (0.8 in a preferred embodiment), then the destination color is considered to be an exact match of the source color, and an equivalent representation (RGB) of the destination device specification (CMYK) of the destination color is entered in the lookup table.

If the distance from the source color to the closest destination color is greater than the threshold value, then the match is considered not exact. The table entry for the source color is then calculated by interpolating between some number of closest destination points, for example the four closest destination points which form a tetrahedron, if such points can be found.

Various techniques for tetrahedral interpolation are known in the art and may be used with the present invention. One such technique is described in Hung, Colorimetric calibration in electronic imaging devices using a look-up-table model and interpolations, *Journal of Electronic Imaging* 2(1), 53–61 (January, 1993), incorporated herein by reference. As described therein, matrix inversion may be used to determine whether a point is included in a tetrahedron formed by four other points using the following equation:

$$\begin{bmatrix} \alpha \\ \beta \\ \gamma \end{bmatrix} = \begin{bmatrix} r_1 - r_0 & r_2 - r_0 & r_3 - r_0 \\ g_1 - g_0 & g_2 - g_0 & g_3 - g_0 \\ b_1 - b_0 & b_2 - b_0 & b_3 - b_0 \end{bmatrix}^{-1} \cdot \begin{bmatrix} r_p \\ g_p \\ b_p \end{bmatrix},$$

Beginning with the first four closest points as recorded in scratchpad memory, each permutation of points is checked in turned until the points are found to form a tetrahedron about the source color point or until the points are exhausted. In the instance where no four points are found to form a tetrahedron about the source color point, the source color is judged not to be reproducible by the destination device and is treated accordingly as described below.

The order in which the twenty closest measured destination color points are checked is as follows:

| 1 | 1 | 1 | 1 |
| 2 | 2 | 2 | 2 |
| 3 | 3 | 3 | 3 |
| 4 | 5 | 6 | 20 | then, if necessary,

| 1 | 1 | 1 | 1 |
| 2 | 2 | 2 | 2 |
| 4 | 4 | 4 | 4 |
| 5 | 6 | 7 | 20 | and so on. If no tetrahedron can be found, then the color is judged to not be reproducible by the destination device; i.e., the color is determined to be out of gamut.

Although tetrahedral interpolation has been described, other types of interpolation, for example tri-linear interpolation, may also be suitable.

Out-of-gamut colors may be mapped by clipping, linear compression, nonlinear compression, or some combination of these, to the destination device gamut. The particular mapping technique employed is not important for purposes of the present invention. For simplicity of description, out-of-gamut colors will be assumed to be mapped by clipping to the destination device gamut.

Whichever particular mapping technique employed, there are liable to be instances in which, if the mapping is left unchanged, objectionable hue shifts or other artifacts will be produced. As described in Shinoda et al., Categorized color space on CRT in the aperture and the surface color mode, *Color Research And Application,* Volume 18, Number 5, October 1993, pp. 326–33, Berlin and Kay proposed 11 basic color terms which are common in all developed languages through comparative studies of languages. In English, these color terms, or color names, am white, gray, black, blue, green, yellow, orange, brown, red, pink, and purple. It has been demonstrated in psychophysical experiments that the 11 basic color names can be expected to be used consistently by each individual subject, be used by common consent among groups of subjects, and require a shorter response time to name.

Based on the foregoing research, as well as other similar research, color name boundaries, for a luminance value of 20 cd/m$^2$, may be represented as in FIG. 2. A more complete characterization of color boundaries is presented in FIG. 4. In accordance with the present color gamut mapping arrangement, when an out-of-gamut color within one color name boundary is mapped to an in-gamut color within a different color name boundary, a color name boundary violation is said to have occurred.

In an exemplary embodiment, color names are stored in the color lookup table of FIG. 1. The lookup table entry of each grid intersection is tagged with a value indicative of a corresponding color name. For each cube within the RGB Cube of FIG. 1, different vertices may have different color name tags. For colors within a given cube, whose lookup table values are interpolated from the lookup table values of the vertices, the color name tag may be determined by "majority vote" of the vertices. A convenient way to implement voting is to assigned different integer values to different color name tags. For example, red might be assigned a value of 1, orange might be assigned a value of 2, yellow might be assigned a value of 3, etc. To determine the color of points within a particular cube, the tag values of the eight vertices are added. The result is then divided by eight, and the integer portion of the result is taken as the tag value result.

For example, given a particular cube, five vertices might have a red value of 1 and three vertices might have an orange value of 2. The sum of the tag values would then be 11. Dividing the sum by eight yields a value of 1⅜, which is truncated to 1. Since this corresponds to red, points inside the cube are considered to have the color name of red.

In a separate table there are stored "anchor point" color coordinates for each of the colors. Preferably, the anchor points represent the centroids of the respective color regions.

In accordance with the present gamut mapping method, color name boundary violations are detected, and the mapping that produced the color name boundary violation is modified so as to not produce a color name boundary violation. This situation is illustrated in FIG. 2. Although the source gamut 11 and the destination gamut 21 are shown in XYZ space consistent with the results of Shinoda and others, in a preferred embodiment both are represented in the chosen perceptually-uniform color space, such as L*a*b*. A portion of the source gamut is outside the destination gamut.

In the illustration of FIG. 2, an out-of-gamut color A having a first color name is initially mapped to an in-gamut color A' having a different color name. This color name boundary violation is detected, and the mapping is modified such that color A maps to a color A" having the same color name. Some colors are not clearly identifiable with a particular color name and therefore are not included within any color name boundary. The tag value for these colors may be zero. Because such colors do not have any color name, no color name boundary violation can occur, and mapping of the colors is unaffected.

An initial mapping that produces a color name boundary violation may be modified in any of several ways. For example, the vector extending from color A to color A' may be incrementally "nudged" toward to the anchor point of the named color of color A until it points to a color A" having the same color name as color A. Alternatively, the vector may be swung in a single increment so as to point directly at the anchor point.

An exemplary manner of gamut mapping in which color name boundary violations are corrected may be better understood with reference to FIG. 3. FIG. 3 assumes that a list of out-of-gamut colors has been kept during the previous table-building procedure.

Clipping is assumed to be performed within a perceptually-uniform color space in such a manner as to maintain chromaticity. It should be understood, however, that instead compression may, for speed considerations, be performed in a device-dependent color space, and that other mappings may be used.

In a first step of the mapping routine, the color name of an out-of gamut color A to be mapped is checked. Next, conventional clipping based on the CIELAB ΔE* recommendation (or other mapping) is performed, whereby the out-of-gamut color A is mapped to an in-gamut color A'. The color name of the in-gamut color A' is then checked. If the color names of A and A' match, then the results of the mapping are stored in the color lookup table of FIG. 1.

If the color names of A and A' do not match, then the mapping is modified. In the illustrated embodiment, this modification is performed incrementally, in N increments.

First, the length of the color space vector $\overline{CS}_1$ from A to A' is determined. Then a color space vector $\overline{CS}_2$ from A to the anchor point of A, designated $A_0$, is determined. The color space vector $\overline{CS}_2$ is scaled so as to have the same length as the color space vector $\overline{CS}_1$. The difference vector $\overline{CS}_2 - \overline{CS}_1$ is formed and scaled by 1/N to produce an increment vector, $\overline{CS}_{inc}$. The increment vector $\overline{CS}_{inc}$ is repeatedly added to the color space vector $\overline{CS}_1$ until a point P is reached having the same color name as A.

To locate the color A" on the surface of the destination gamut from the point P having the correct direction but not located on the gamut surface, one method is to form ratios of the color components of the point P. The same ratios may be precalculated for each of the sample colors in the destination gamut. The ratios are compared with the ratios of the point P. If the sum of the differences between the ratios is below a predetermined threshold, then the distance of the corresponding color from black is calculated. The color satisfying the threshold criterion and located the greatest distance from black is taken as the color A".

By adding the constraint that color name boundaries cannot be violated, a significant increase in freedom is achieved while maintaining minimal perceptual objections. The increased freedom allows the mapping of out-of-gamut colors to be better balanced and thus significantly more visually pleasing than in conventional methods.

Using the Lookup Table

The mapping table is used to look up a destination color based on a color specification for the source device. Since the color mapping table is a subset of all reproducible colors, adjacent points are selected by the source color specification and interpolated to provide the destination color specification. Various suitable interpolation techniques are well-known in the art. A preferred embodiment of the invention uses trilinear interpolation to simulate a complete lookup table, but other interpolation techniques could be used.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. In a computer graphics system having a color image source device and a color image destination device having non-coincident color gamuts such that a plurality of colors within a color gamut of the source device are out-of-gamut colors outside a color gamut of the destination device, a method of mapping source device colors to destination device colors using a programmed computer, comprising the steps of:

a) storing in machine-readable form a correspondence between computer colors, including colors within the color gamut of the source device and colors within the color gamut of the destination device, and perceived color names, said correspondence between computer colors and perceived color names being based on psychophysical experimentation;

b) using said correspondence, associating a color name with an out-of-gamut color;

c) mapping said out-of-gamut color to a first in-gamut color within the color gamut of the destination device;

d) using said correspondence, associating a color name with said first in-gamut color; and e) if the color name associated with the out-of-gamut color and the color name associated with the first in-gamut color are different, automatically remapping under program control said out-of-gamut color to a different in-gamut color within the color gamut of the destination device.

2. The apparatus of claim 1, comprising the further step of:

f) if the color name associated with the out-of-gamut color and the color name associated with the different in-gamut color are different, remapping said out-of-gamut color to a still different in-gamut color within the color gamut of the destination device.

3. The apparatus of claim 2, comprising the further step of:

g) repeating step f) until the color name associated with the out-of-gamut color and the color name associated with the different in-gamut color are the same.

4. The apparatus of claim 1, in step c) of which said mapping is performed so as to minimize a color distance $\Delta E^*$ between the out-of-gamut color and the first in-gamut color.

5. The apparatus of claim 1, comprising the further step of:

b1) identifying by color coordinates an anchor point associated with the color name of the out-of-gamut color.

6. The apparatus of claim 5, in step e) of which said remapping comprises identifying as the different in-gamut color a color closer than the first in-gamut color to a line joining the out-of-gamut color and the anchor point.

* * * * *